(12) United States Patent
Lee et al.

(10) Patent No.: US 9,114,510 B2
(45) Date of Patent: Aug. 25, 2015

(54) PAWL STRUCTURE FOR RATCHET WRENCHES AND THE WRENCHES USING THE SAME

(71) Applicants: Tsan-Chang Lee, Taichung (TW); Yueh-Li Wang, Taichung (TW)

(72) Inventors: Tsan-Chang Lee, Taichung (TW); Yueh-Li Wang, Taichung (TW)

( * ) Notice: Subject to any disclaimer, the term of this patent is extended or adjusted under 35 U.S.C. 154(b) by 171 days.

(21) Appl. No.: 13/920,088

(22) Filed: Jun. 18, 2013

(65) Prior Publication Data

US 2014/0366690 A1    Dec. 18, 2014

(51) Int. Cl.
*B25B 13/46*      (2006.01)
*B25B 23/00*      (2006.01)
*F16D 41/12*      (2006.01)

(52) U.S. Cl.
CPC ............ *B25B 13/463* (2013.01); *B25B 23/0007* (2013.01); *F16D 41/12* (2013.01)

(58) Field of Classification Search
CPC ................ B25B 13/46; B25B 13/461–13/463; B25B 23/0007; F16D 41/16
USPC ..................................................... 81/61–63.2
See application file for complete search history.

(56) References Cited

U.S. PATENT DOCUMENTS

| 6,457,387 | B1 | * | 10/2002 | Hu | ................................ | 81/63.2 |
| 6,584,875 | B1 | * | 7/2003 | Deng | ............................ | 81/63.1 |
| 6,629,477 | B2 | * | 10/2003 | Ling et al. | ..................... | 81/63.2 |
| 7,444,904 | B2 | * | 11/2008 | Huang | .......................... | 81/63.2 |
| 8,291,792 | B2 | * | 10/2012 | Yang | ............................. | 81/63.2 |
| D708,920 | S | * | 7/2014 | Lee et al. | ......................... | D8/21 |
| 2003/0019335 | A1 | * | 1/2003 | Hu | ................................ | 81/63.2 |
| 2004/0083860 | A1 | * | 5/2004 | Arnold et al. | .................. | 81/63.2 |
| 2004/0200322 | A1 | * | 10/2004 | Hu | ................................ | 81/63.2 |
| 2007/0277652 | A1 | * | 12/2007 | Tuan-Mu | ......................... | 81/63 |
| 2014/0000415 | A1 | * | 1/2014 | Lee et al. | ......................... | 81/60 |
| 2014/0020518 | A1 | * | 1/2014 | Huang | ............................ | 81/63.1 |
| 2014/0083259 | A1 | * | 3/2014 | Anderson et al. | .............. | 81/63.1 |

* cited by examiner

*Primary Examiner* — Joshua Kennedy (57) ABSTRACT

A pawl structure of ratchet wrenches has multiple engaging teeth, a first recess and a second recess. The engaging teeth include first teeth at the mediate portion and second teeth are respectively located at two ends of the engaging teeth. The tips of the first teeth are located on a first curve which has a center and a central line extends through the center and intersects the first curve. The tips of the second teeth are located on a second curve which gradually leaves from the center of the first curve along with the second curve extending away from the central line. The first recess is located corresponding to the central line and the first teeth. The second recess is located corresponding to the second teeth.

10 Claims, 12 Drawing Sheets

PAWL STRUCTURE FOR RATCHET WRENCHES AND THE WRENCHES USING THE SAME

FIELD OF THE INVENTION

The present invention relates to a pawl and wrenches using such pawl, and more particularly, to a pawl structure used for dual-direction and one-direction ratchet wrenches.

BACKGROUND OF THE INVENTION

Figure 15:
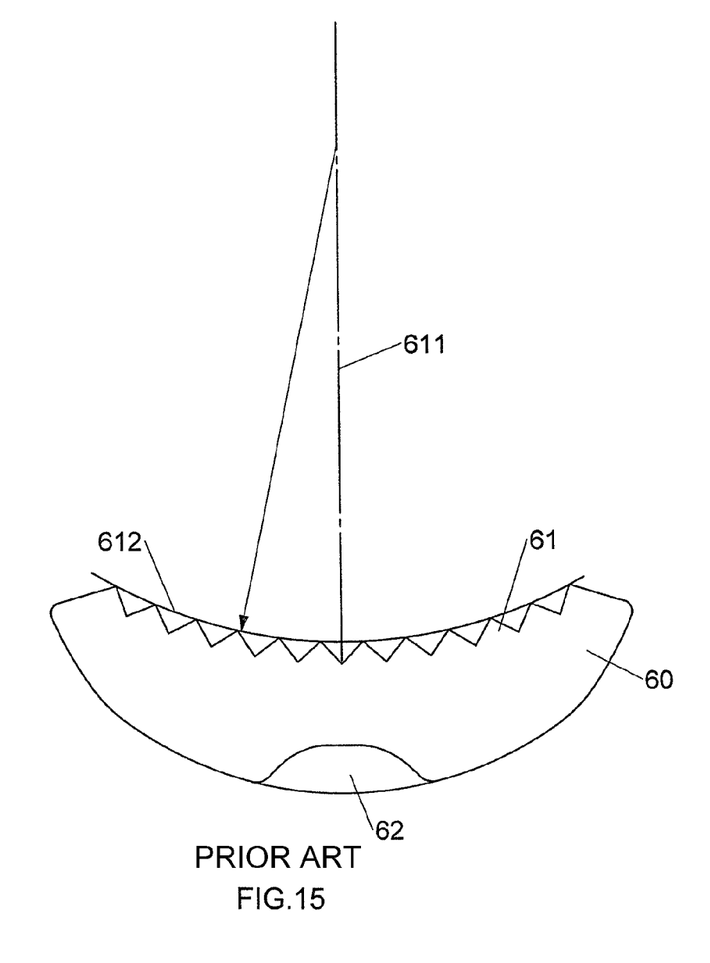
FIG. 15 is a top view to show the conventional pawl for dual-direction ratchet wrench.
Figure 16:
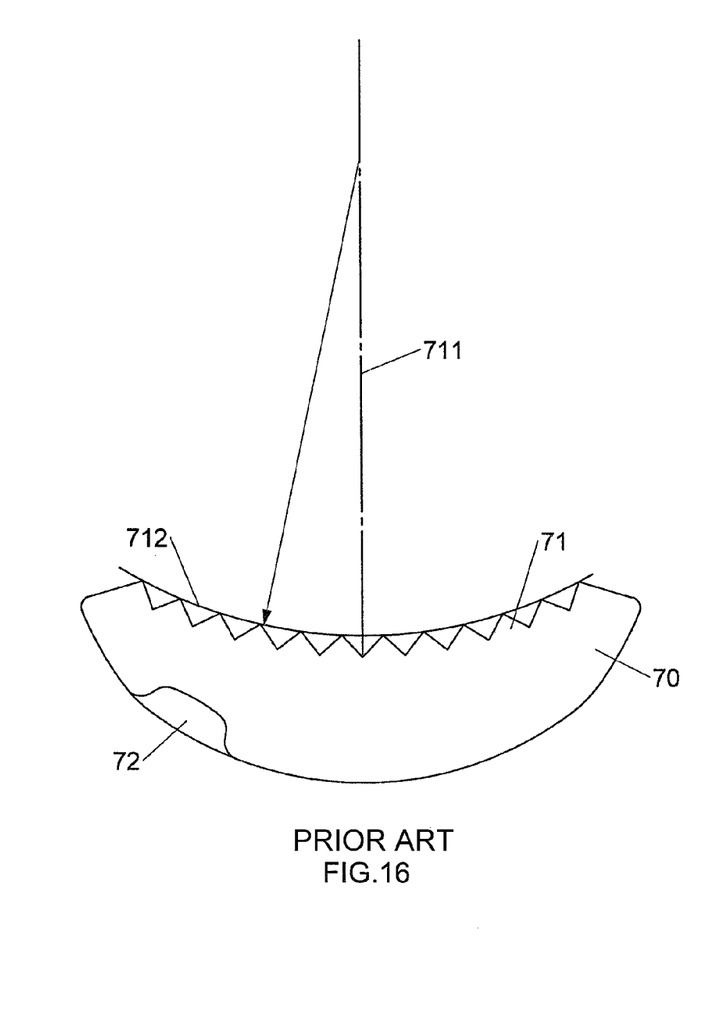
FIG. 16 is a top view to show the conventional pawl for one-direction ratchet wrench.

The two respective conventional pawls 60, 70 for the dual-direction wrench and one-direction wrench are disclosed in FIGS. 15 and 16, and each of the pawls 60, 70 generally comprises engaging teeth 71/71 formed on the first side thereof and the tips of the engaging teeth 61/71 are located along a curve 612/712. A central line 611/711 extends through the center of the curve 612/712. A recess 62/72 is defined in the second side of the pawl 60/70. The central line 611 extends through the center of the recess 62. The recess 62/72 accommodates a switch member so as to control the pivotal movement of the pawl 60. The recess 72 of the pawl 70 is located off from the central line 711 so as to drive the pawl in only one direction. The pawl 60/70 cannot be used for both of the dual-direction wrench and one-direction ratchet wrench.

The present invention intends to provide a pawl which can be used for both of the dual-direction wrench and one-direction ratchet wrench.

SUMMARY OF THE INVENTION

The present invention relates to a pawl structure and ratchet wrenches using such pawl. The pawl has multiple engaging teeth defined in the first side thereof, and a first recess and a second recess are defined in the second side of the pawl. The engaging teeth include first teeth at the mediate portion thereof and second teeth are respectively located at two ends of the engaging teeth. The tips of the first teeth are located on a first curve which has a center and a central line extends through the center and intersects the first curve. The tips of the second teeth are located on a second curve which gradually leaves from the center of the first curve along with the second curve extending away from the central line. The first recess is located corresponding to the central line and the first teeth. The second recess is located corresponding to the second teeth.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 4, the pawl structure of a dual-direction ratchet wrench of the present invention comprises a body 10 which has a first space 11 defined through one end thereof. A second space 12 is defined in the inner periphery of the first space 11 and has the diameter that is smaller than the diameter of the first space 11. The center of the second space 12 is located within the first space 11. A third space 13 is defined in the inner periphery of the second space 12. The third space 13 has two positioning portions 14 formed therein. A first groove 15 is defined in the inner periphery of the first space 11. A ratchet wheel 20 is rotatably located in the first space 11 and has driving teeth 21 defined in outside thereof. A mounting hole 22 is defined centrally in the ratchet wheel 20. The mounting hole 22 of the ratchet wheel 20 is a polygonal hole for being mounted to a bolt or the like. The mounting hole 22 of the ratchet wheel 20 can also be replaced with a rectangular part which can be cooperated with a socket. A second groove 23 is defined in the outside of the ratchet wheel 20. A second clip 50 is engaged between the first and second grooves 15, 23. The pawl 30 is located in one side of the second space 12 and movable in the second space 12. The pawl 30 has engaging teeth 31 defined in the first side thereof and the engaging teeth 31 are engaged with the driving teeth 21 of the ratchet wheel 20.

The engaging teeth 31 comprise multiple continuous first teeth 311 at the mediate portion thereof. Multiple second teeth 312 and third teeth 313 are respectively located at two ends of the two ends of the first teeth 311. The second and the third teeth 312, 313 have the same shape and number. The ratio of number of teeth between the first teeth 311 and the second teeth 312 is within a range of 1.5:1 to 3.5:1, preferably, the ratio is 2:1. Each tooth of the engaging teeth 31 has a tip and a root, the tip is a curved face and the root is a recessed area. The tips of the first teeth 311 are located on a first curve 316 which has a center. A central line 315 extends through the center and intersects the first curve 316. The tips of the second teeth 312 are located on a second curve 317. The tips of the third teeth 313 are located on a third curve 314. The second and third curves 317, 314 have the identical radius and are located symmetrically relative to the central line 315. The center C2 of the second curve 317 is located on the central line 315. The diameter of the second curve 317 is larger than that of the first curve 316. The second curve 317 gradually leaves from the center C1 of the first curve 316 along with the second curve 317 extending away from the central line 315. The pawl 30 has a first recess 32 defined in the second side thereof and the first recess 32 is located corresponding to the central line 315 and the first teeth 311. One end of the first recess 32 located along the axial direction of the pawl 30 is a closed end and the other end is an open end. Two second recesses 33 are respectively located on two sides of the first recess 32 and located corresponding to the second teeth 312. The second recesses 33 are located symmetrically relative to the central line 315. Each second recess 33 has a closed end and an open end.

Figure 1:
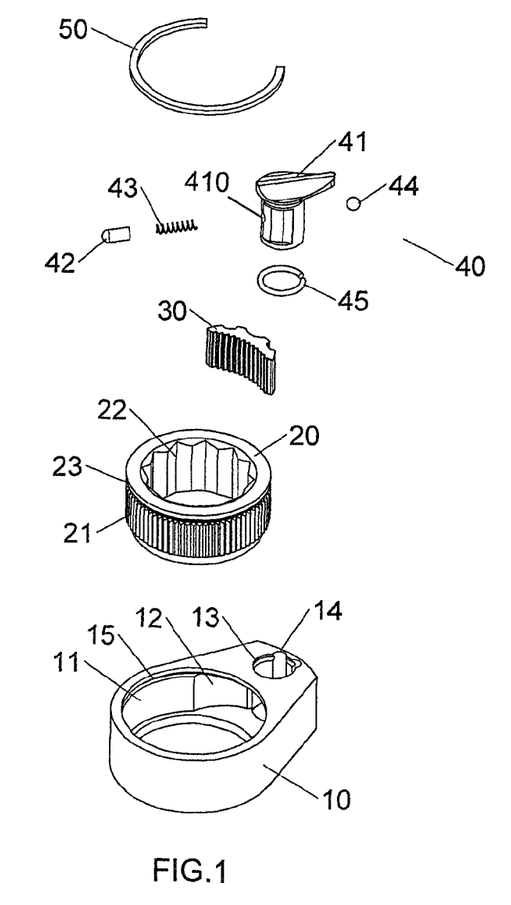
FIG. 1 is an exploded view to show the ratchet wrench with the pawl structure of the present invention.

A switch unit 40 is located in the third space 13 so as to control movement of the pawl 30 in the second space 12. The switch unit 40 has a switch member 41, an end piece 42, a first resilient member 43, a bead 44 and a first clip 45. The switch member 41 is rotatably located in the third space 13 and has a lever on one end thereof, the lever is exposed on outside of the body 10. The end piece 42, the first resilient member 43 and the bead 44 are located in the restriction recess 410 of the switch member 41. The first resilient member 43 is biased between the end piece 42 and the bead 44, so that the end piece 42 is biased by the first resilient member 43 to contact the first recess 32 of the pawl 30. The bead 44 is biased to contact one of the positioning portions 14 to position the switch unit 40. The first clip 45 is engaged between the switch member 41 and the third space 13 so as to be pivotably located in the third space 13. The second clip 50 is a resilient C-clip which is located in the first and second grooves 15, 23 to rotatably position the ratchet wheel 20 in the first space 11.

Figure 5:
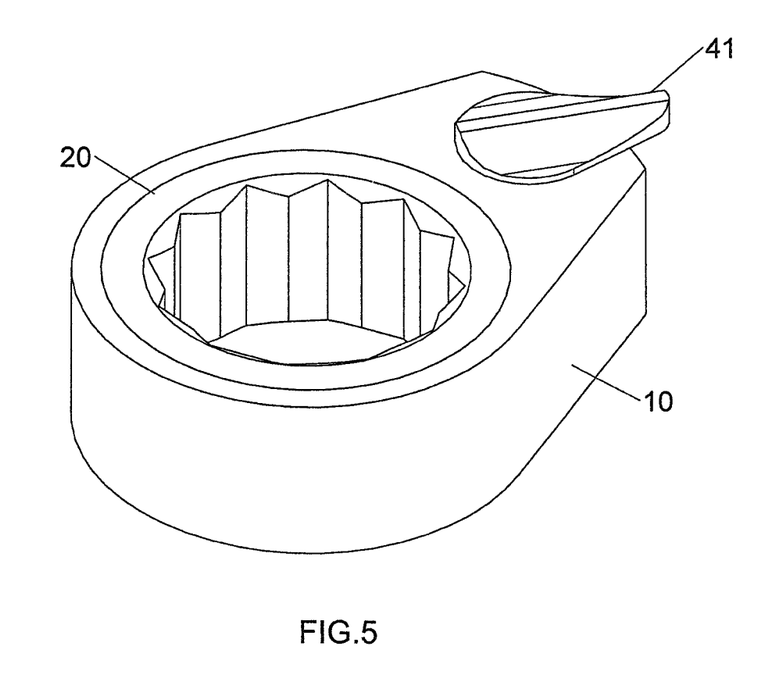
FIG. 5 is perspective view to show a portion of the ratchet wrench of the present invention.
Figure 6:
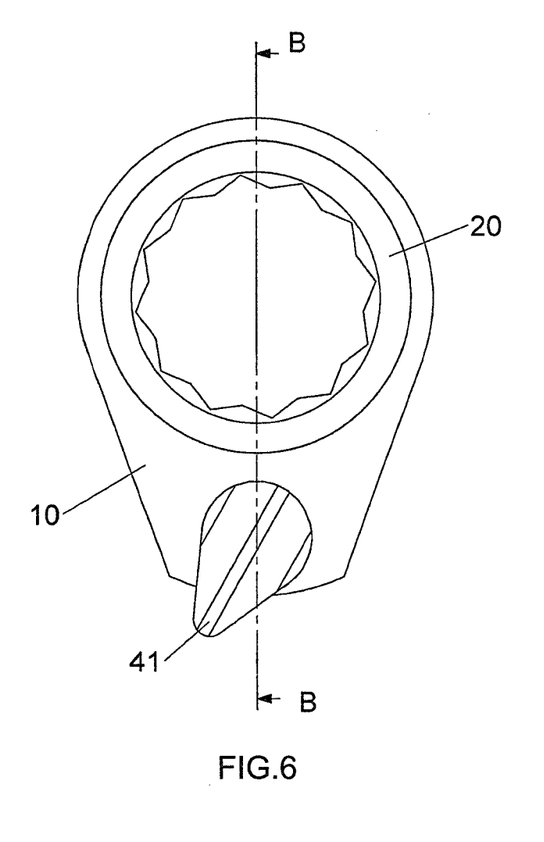
FIG. 6 is top view of a portion of the ratchet wrench of the present invention.
Figure 7:
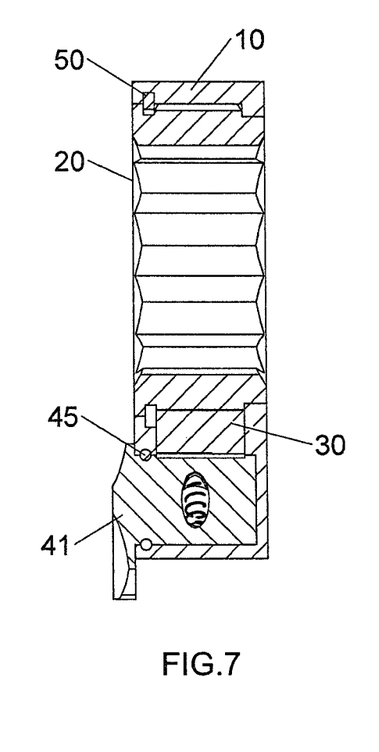
FIG. 7 is a cross sectional view, taken along line 6-6 of FIG. 6.

As shown in FIGS. 5 to 7, the switch unit 40 is located in the third space 13 and the pawl 30 is located in one side of the second space 12. The ratchet wheel 20 is located in the first space 11. The clip 50 is located in the first and second grooves 15, 23 to rotatably position the ratchet wheel 20 in the first space 11.

Figure 8:
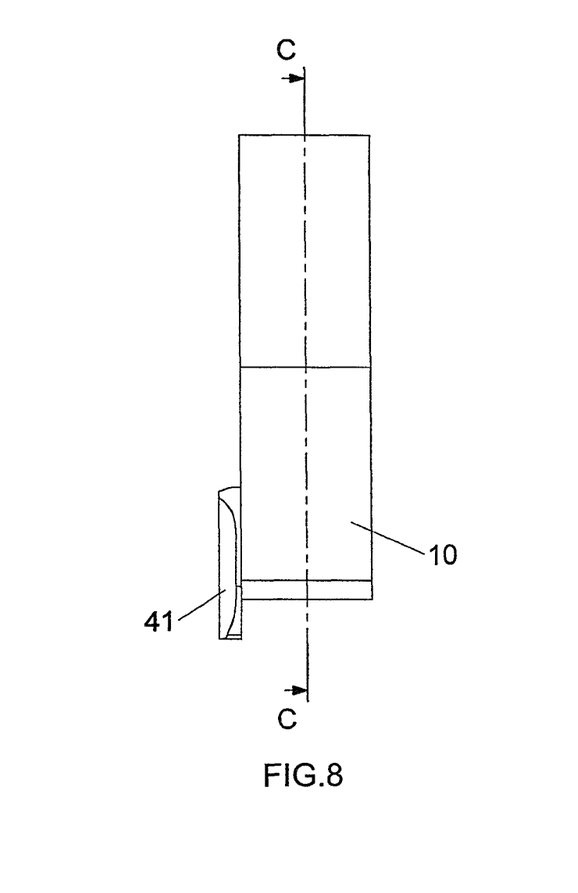
FIG. 8 is side view of a portion of the ratchet wrench of the present invention.
Figure 9:
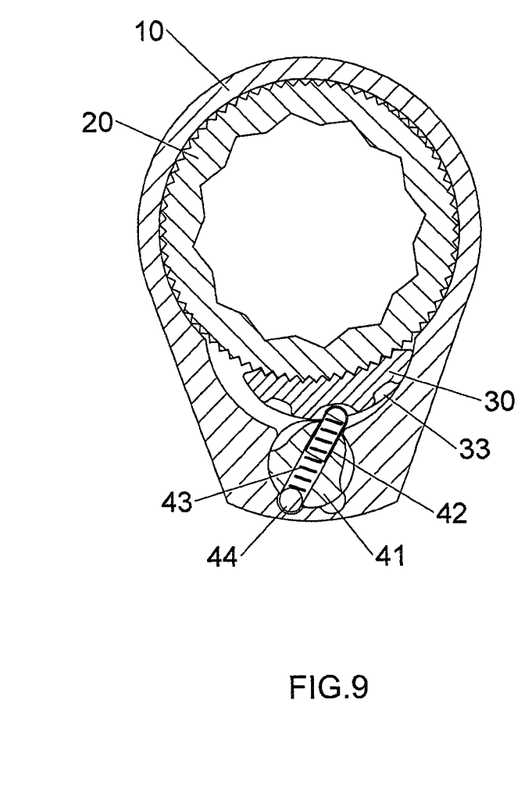
FIG. 9 is a cross sectional view, taken along line 8-8 of FIG. 8.

As shown in FIGS. 8 and 9, when the ratchet wrench is rotated clockwise, the ratchet wrench outputs torque. The pawl 30 is located in the second space 12. The ratchet wheel 20 is located in the first space 11. The end piece 42 is biased by the first resilient member 43 to contact the first recess 32 to engage the engaging teeth 31 with the driving teeth 21. The bead 44 is biased by the first resilient member 43 to contact the positioning portion 14 to position the switch unit 40.

Figure 10:
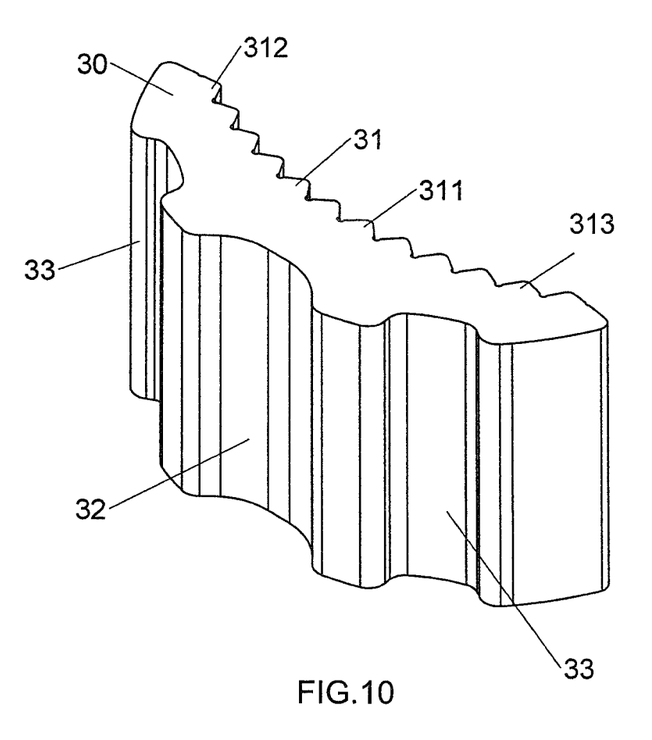
FIG. 10 is a perspective view to show the second embodiment of the pawl of the present invention.

FIG. 10 shows the second embodiment of the pawl 30, wherein two ends of each of the first recess 32 and the second recess 33 located along the axial direction of the pawl 30 are open ends.

Figure 11:
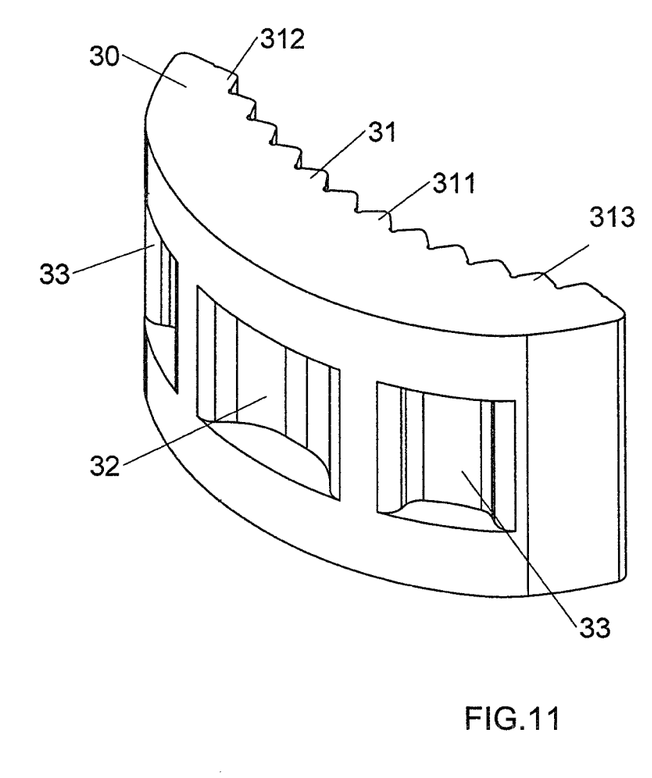
FIG. 11 is a perspective view to show the third embodiment of the pawl of the present invention.

FIG. 11 shows the third embodiment of the pawl 30, wherein two ends of each of the first recess 32 and the second recess 33 located along the axial direction of the pawl 30 are closed ends.

Figure 12:
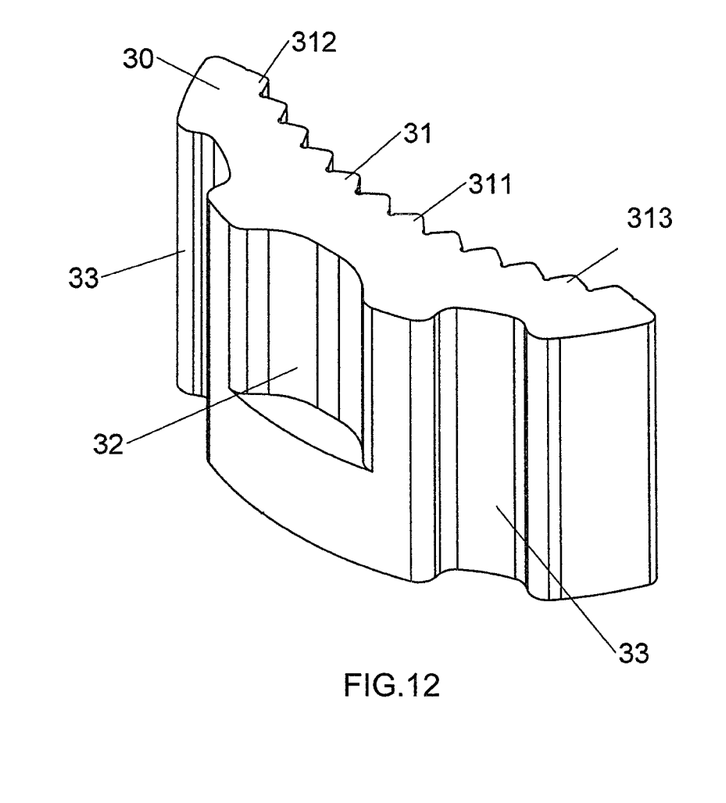
FIG. 12 is a perspective view to show the fourth embodiment of the pawl of the present invention.

FIG. 12 shows the fourth embodiment of the pawl 30, wherein one end of the first recess 32 located along the axial direction of the pawl 30 is a closed ends, and the two ends of the second recess 33 located along the axial direction of the pawl 30 are two open ends.

Figure 13:
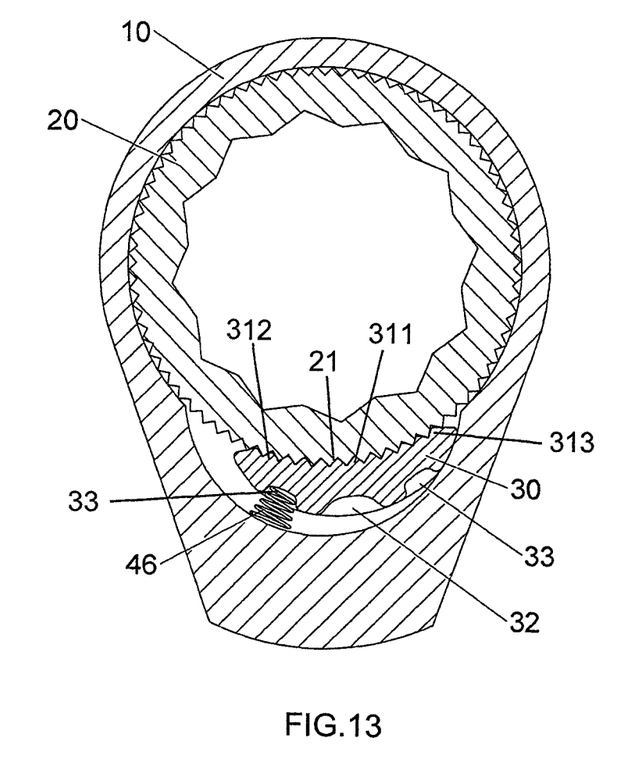
FIG. 13 is a perspective view to show the fifth embodiment of the pawl of the present invention.

FIG. 13 shows the fifth embodiment of the pawl 30, wherein the pawl 30 has the second recesses 33 so that the pawl 30 can be used in the one-direction ratchet wrench. The second resilient member 46 is located in one of the two second recesses 33 so that the pawl 30 cannot move in the second space 12, therefore, the ratchet wrench can only operated in one direction.

Figures 2, 3, 4:
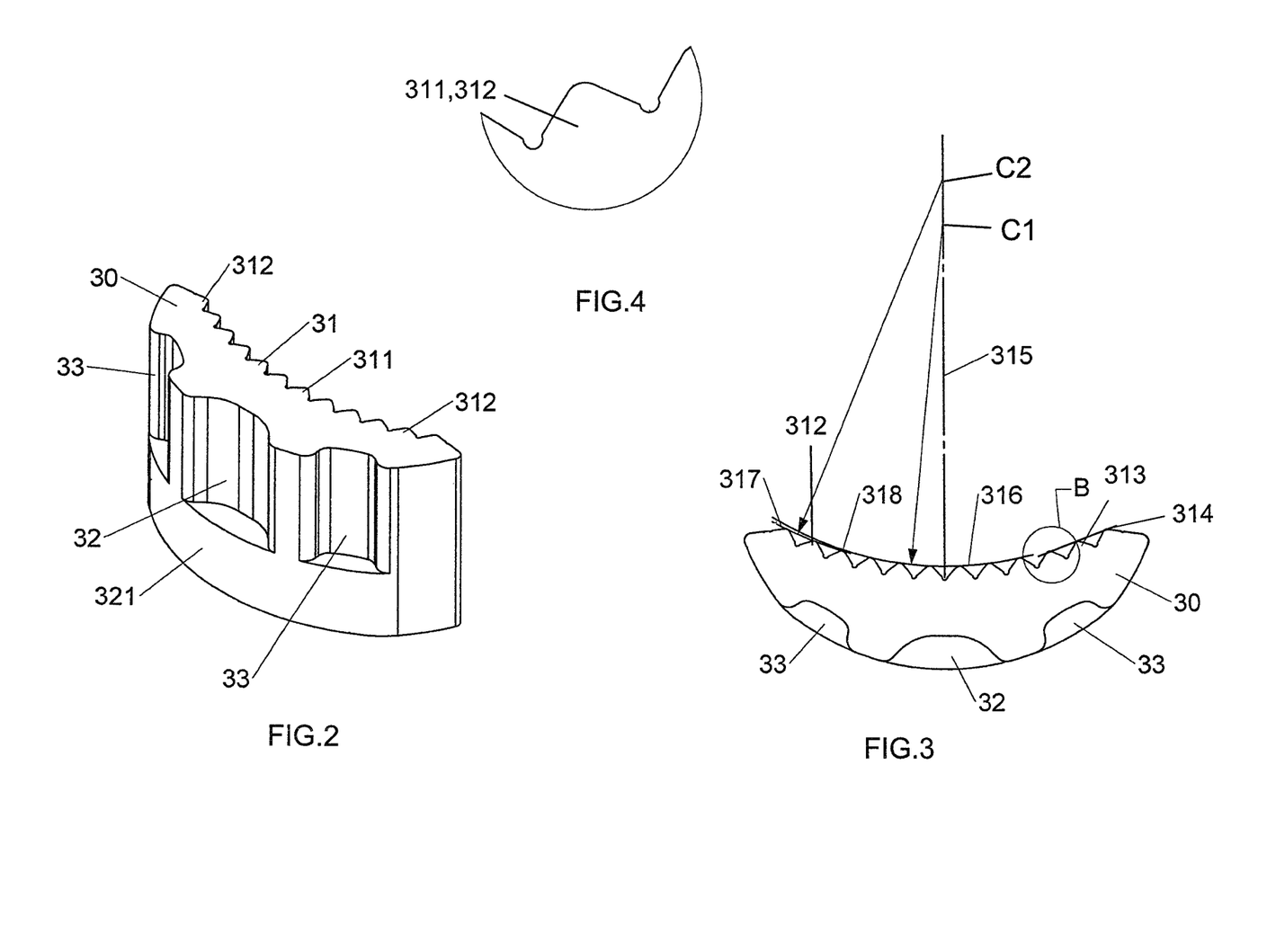
FIG. 2 is a perspective view to show the pawl of the present invention.
FIG. 3 is a top view to show the pawl of the present invention.
FIG. 4 is an enlarged view to show the circled B in FIG. 3.
Figure 14:
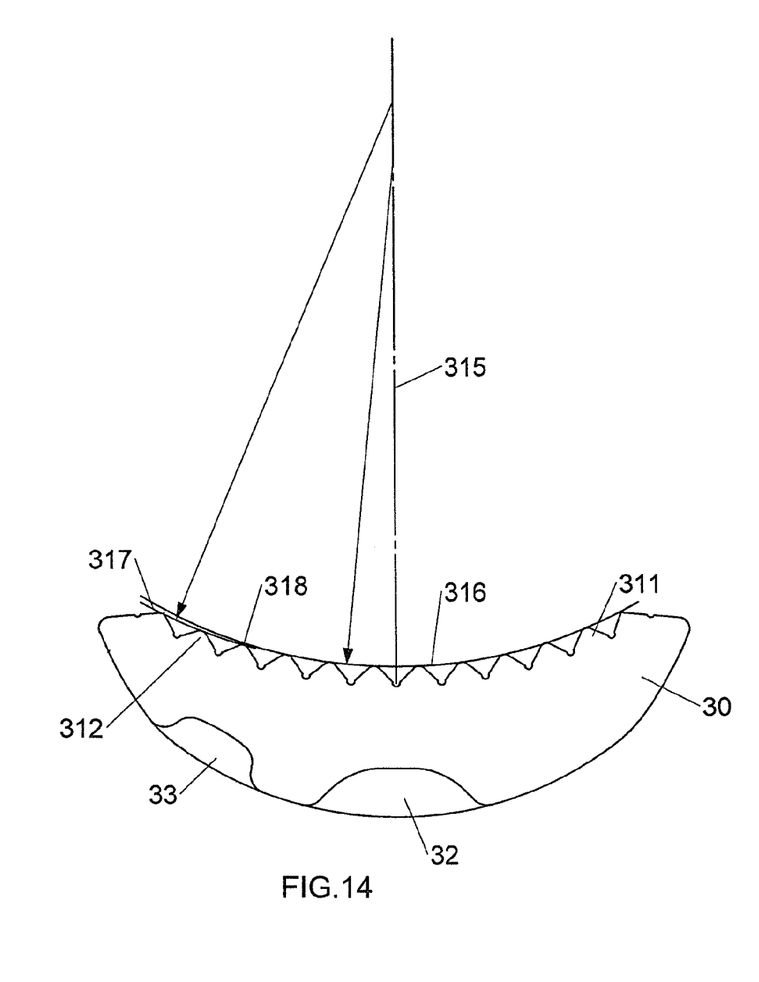
FIG. 14 is a perspective view to show the sixth embodiment of the pawl of the present invention.

FIG. 14 shows the sixth embodiment of the pawl 30, wherein the pawl 30 has only one second recesses 33 defined on one side of the first recess 32 so that the pawl 30 can only be installed to one side of the dual-direction or one-direction ratchet wrench. As shown in FIG. 2, the pawl 30 has two second recesses 33, so that the pawl 30 can be installed to both sides of the dual-direction or one-direction ratchet wrench. The pawl 30 located in the second space 12 has no restriction of direction.

The advantages of the present invention are as follows:
1. The pawl 30 has the engaging teeth 31, the first recess 32 and the second recess 33, so as to be suitable for the one-direction ratchet wrench or the dual-direction ratchet wrench.
2. The pawl 30 has two second recesses 33 so that it can be installed to both sides of the one-direction ratchet wrench or the dual-direction ratchet wrench.
3. Each tip of the engaging teeth 31 is a curved face and each root is a recessed area so that the engaging teeth 31 do not hit the roots of the driving teeth 21 of the ratchet wheel 20.
4. When the pawl 3 moves backward, the second teeth 312 are designed to allow the driving teeth 21 to smoothly move over the engaging teeth 31.

While we have shown and described the embodiment in accordance with the present invention, it should be clear to those skilled in the art that further embodiments may be made without departing from the scope of the present invention.

What is claimed is:

1. A pawl structure for a ratchet wrench, comprising:
   a pawl having multiple engaging teeth defined in a first side thereof and the engaging teeth comprising multiple continuous first teeth at a mediate portion thereof, multiple second teeth located on at one end of the engaging teeth, a ratio of number of teeth between the first teeth and the second teeth being within a range of 1.5:1 to 3.5:1, each tooth of the engaging teeth having a tip and a root, the tip being a curved face and the root being a recessed area, the tips of the first teeth located on a first curve which has a center, a central line extending through the center and intersecting the first curve, the tips of the second teeth located on a second curve, the second curve extending away from the central line, a center of the second curve located on the central line, a radius of the second curve being larger than that of the first curve, the pawl having a first recess defined in a second side thereof and the first recess located corresponding to the central line and the first teeth, at least one end of the first recess located along an axial direction of the pawl being a closed end, two second recesses located on two sides of the first recess, at least one end of the two second recesses located along an axial direction of the pawl being a closed end, multiple continuous third teeth being defined on the other end of the engaging teeth, the second and the third teeth having the same shape and number, the tips of the second teeth and the third teeth being located on the second curve, the second and the third teeth being located symmetrically relative to the central line, the two second recesses being respectively located corresponding to the second teeth and the third teeth.

2. The pawl structure as claimed in claim 1, wherein a ratio of number of teeth between the first teeth and the second teeth is 2:1.

3. A ratchet wrench having the pawl structure as claimed in claim 1, wherein the ratchet wrench is a dual-direction ratchet wrench and comprises a body which has a first space defined through one end thereof, a second space is defined in an inner periphery of the first space and has a diameter that is smaller than a diameter of the first space, a center of the second space is located within the first space, a third space is defined in an inner periphery of the second space, the pawl is located in a side of the second space and movable in the second space, said ratchet wheel rotatably located in the first space and having driving teeth defined in outside thereof, a mounting hole is defined centrally in the ratchet wheel, the engaging teeth are engaged with the driving teeth of the ratchet wheel, a switch unit is located in the third space so as to control movement of the pawl in the second space, the switch unit has a switch member, an end piece and a first resilient member, the switch member is rotatably located in the third space and has a lever on one end thereof, the lever is exposed on outside of the body, the end piece and the first resilient member are located in the switch member, the end piece is biased by the first resilient member to contact the first recess of the pawl.

4. The ratchet wrench as claimed in claim 3, wherein a first groove is defined in the inner periphery of the first space and a second groove is defined in an outside of the ratchet wheel, a second clip is engaged between the first and second grooves.

5. The ratchet wrench as claimed in claim 3, wherein the mounting hole of the ratchet wheel is a polygonal hole.

6. The ratchet wrench as claimed in claim 3, wherein the third space has a two positioning portions, the switch unit has the end piece, the first resilient member and a bead, the first resilient member is biased between the end piece and the bead, the end piece is biased to contact the first recess and the bead is biased to contact one of the positioning portions to position the switch unit.

7. The ratchet wrench as claimed in claim 3, wherein the switch unit has a first clip which is engaged between the switch member and the third space to position the switch member in the third space.

8. A ratchet wrench having the pawl structure as claimed in claim 1, wherein the ratchet wrench is a one-direction ratchet wrench and comprises a body, said ratchet wheel and a second resilient member, the body has a first space defined through one end thereof, a second space is defined in an inner periphery of the first space and has a diameter that is smaller than a diameter of the first space, a center of the second space is located within the first space, said ratchet wheel rotatably located in the first space and having driving teeth defined in outside thereof, a mounting hole is defined centrally in the ratchet wheel, the pawl is located in a side of the second space and movable in the second space, the engaging teeth are engaged with the driving teeth of the ratchet wheel, the second resilient member is located in the second recess.

9. The ratchet wrench as claimed in claim 8, wherein a first groove is defined in the inner periphery of the first space and a second groove is defined in an outside of the ratchet wheel, a second clip is engaged between the first and second grooves.

10. The ratchet wrench as claimed in claim 8, wherein the mounting hole of the ratchet wheel is a polygonal hole.

\* \* \* \* \*